No. 769,346. PATENTED SEPT. 6, 1904.
F. C. JACOBY.
LOADING APPARATUS.
APPLICATION FILED APR. 5, 1904.
NO MODEL.

WITNESSES:
L. B. Middleton
H. L. Burke

INVENTOR
Frank C. Jacoby.
BY Herbert W. Jenner
Attorney

No. 769,346. Patented September 6, 1904.

UNITED STATES PATENT OFFICE.

FRANK C. JACOBY, OF ARLINGTON, ILLINOIS.

LOADING APPARATUS.

SPECIFICATION forming part of Letters Patent No. 769,346, dated September 6, 1904.

Application filed April 5, 1904. Serial No. 201,657. (No model.)

*To all whom it may concern:*

Be it known that I, FRANK C. JACOBY, a citizen of the United States, residing at Arlington, in the county of Bureau and State of Illinois, have invented certain new and useful Improvements in Loading Apparatus; and I do hereby declare the following to be a full, clear, and exact description of the invention, such as will enable others skilled in the art to which it appertains to make and use the same.

This invention relates to apparatus for loading manure or other similar substances onto wagons; and it consists in the novel construction and combination of the parts hereinafter fully described and claimed.

Figure 1:
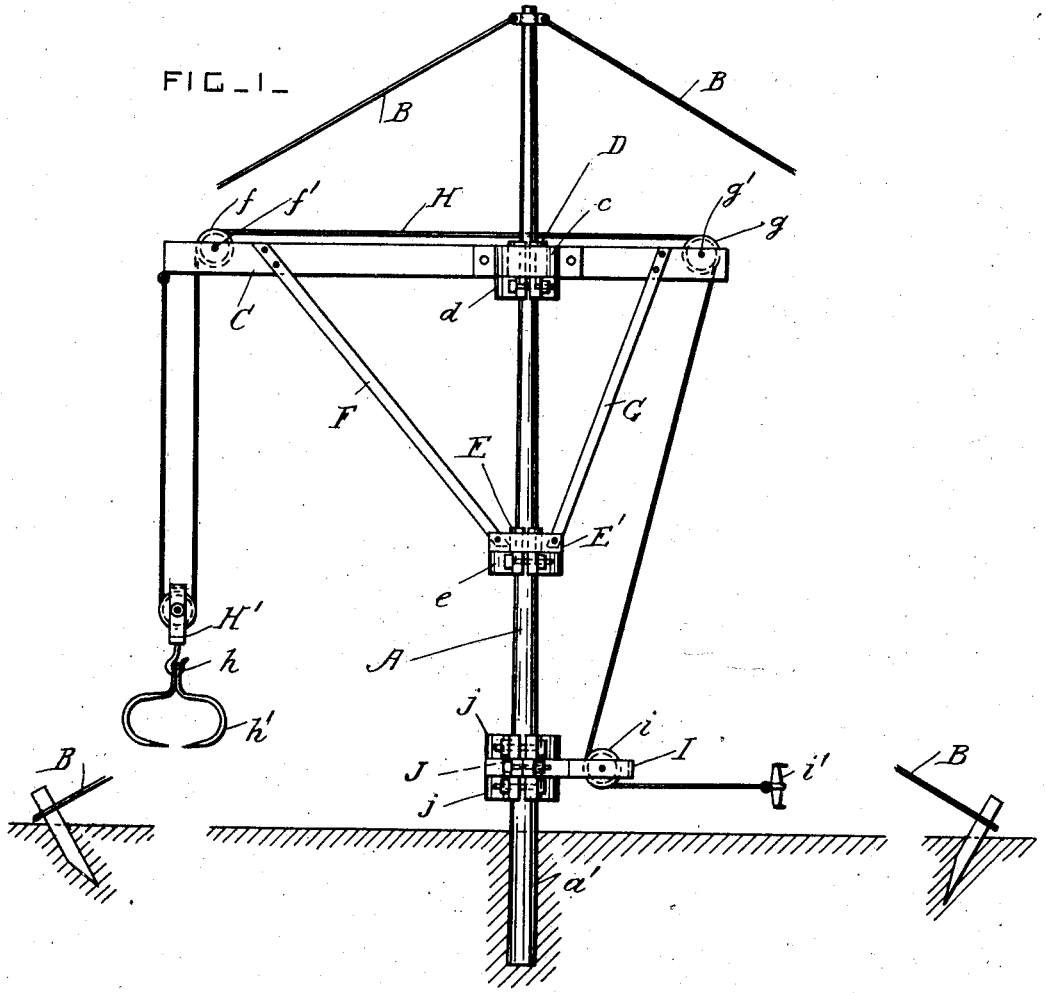
Figure 2:
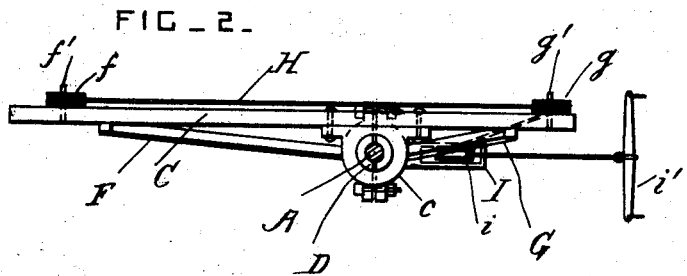

In the drawings, Figure 1 is a side view of the apparatus. Fig. 2 is a plan view of the apparatus.

A is a tapering pole, one end of which is placed in a hole in the ground $a'$, and B represents guy-ropes fastened to the upper end of the pole and staked to the ground, so that the pole is retained in a vertical position. This pole can be moved about from place to place as required.

C is a cross-arm, the middle part of which is provided with a bearing $c$, which is journaled loosely on a thimble D, which is clamped to the upper part of the pole. The thimble is made in halves or sections, so that it can be fitted to the taper of the pole and at any desired position, and it is provided with a flange $d$ at its lower part for the bearing $c$ to rest and revolve upon. E is a similar thimble, which is formed in halves or sections and clamped to the pole below the thimble D. The thimble E is provided with a flange $e$, and E' is a collar which rests and revolves upon the flange $e$.

F and G are two inclined braces. The upper ends of these braces are secured to the cross-arm upon opposite sides of the pole, and their lower ends are secured to the collar E'.

Two sheaves $f$ and $g$ are journaled on pins $f'$ and $g'$, which project from the opposite end portions of the cross-arm, and H is a hoisting-rope which passes over the said sheaves and is secured at one end to the longer end portion of the cross-arm.

H' is a fall-block carried by the said rope and provided with a hook $h$ for engaging with any approved form of manure-fork $h'$. The other end portion of the rope passes over a sheave $i$, which is journaled in a frame I, and the end of the rope is preferably provided with a whiffletree $i'$ for the attachment of a horse.

The frame I is journaled on a thimble J, which is formed of halves or sections which are clamped to the lower part of the pole. The thimble J is provided with flanges $j$, between which the bracket or frame I is free to revolve.

The manure or other similar substance is raised by the fork when the rope is pulled upon, and the cross-arm and other parts carried by the pole are then swung around so that the load may be discharged onto a wagon.

What I claim is—

In loading apparatus, the combination, with a tapering pole, and means for holding it in a vertical position; of three thimbles formed in sections provided with flanges and clamped to the said pole one above the other, a cross-arm provided with a bearing which revolves horizontally on the upper thimble, a collar which revolves on the middle thimble, inclined braces between the said collar and the end portions of the cross-arm, sheaves carried by the end portions of the cross-arm, a frame journaled on the lower thimble, a sheave carried by the said frame, a lifting-rope passing over the said sheaves and having one end secured to the said cross-arm, and a fall-block carried by the said rope and provided with means for supporting the load.

In testimony whereof I have affixed my signature in the presence of two witnesses.

FRANK C. JACOBY.

Witnesses:
J. J. BRANNIGAN,
F. R. G. KEFFINGTON.